United States Patent [19]

Bloomfield et al.

[11] 4,259,637
[45] Mar. 31, 1981

[54] MECHANICAL ASSEMBLIES EMPLOYING SENSING MEANS FOR SENSING MOTION OR POSITION

[75] Inventors: Edward J. Bloomfield, Stroud; Frederick S. Penman, Minsterworth, both of England

[73] Assignee: Ransome Hoffmann Pollard Limited, Chelmsford, England

[21] Appl. No.: 925,671

[22] Filed: Jul. 18, 1978

[30] Foreign Application Priority Data

Jul. 22, 1977 [GB] United Kingdom ............... 30895/77
Dec. 14, 1977 [GB] United Kingdom ............... 52119/77

[51] Int. Cl.³ .................................................. G01P 3/48
[52] U.S. Cl. ..................................... 324/166; 324/173; 324/236
[58] Field of Search ............... 324/166, 173, 174, 207, 324/208, 236; 340/195, 196

[56] References Cited

U.S. PATENT DOCUMENTS

| | | | |
|---|---|---|---|
| 2,541,422 | 2/1951 | Kirkland et al. | 324/173 |
| 3,597,687 | 8/1971 | Seipp | 324/236 |
| 3,942,112 | 3/1976 | Westbrook | 324/166 |

FOREIGN PATENT DOCUMENTS

| | | |
|---|---|---|
| 835020 | 5/1960 | United Kingdom . |
| 1011530 | 12/1965 | United Kingdom . |
| 1088887 | 10/1967 | United Kingdom . |
| 1219836 | 1/1971 | United Kingdom . |
| 1237756 | 6/1971 | United Kingdom . |
| 1245733 | 9/1971 | United Kingdom . |
| 1248294 | 9/1971 | United Kingdom . |
| 1289899 | 9/1972 | United Kingdom . |
| 1300814 | 12/1972 | United Kingdom . |
| 1302507 | 1/1973 | United Kingdom . |
| 1306699 | 2/1973 | United Kingdom . |
| 1336814 | 11/1973 | United Kingdom . |
| 1353306 | 5/1974 | United Kingdom . |
| 1367279 | 9/1974 | United Kingdom . |
| 1371548 | 10/1974 | United Kingdom . |
| 1372741 | 11/1974 | United Kingdom . |
| 1454380 | 11/1976 | United Kingdom . |

Primary Examiner—Michael J. Tokar
Attorney, Agent, or Firm—Sughrue, Rothwell, Mion, Zinn and Macpeak

[57] ABSTRACT

Bearing assemblies with inner and outer races and rolling elements therebetween incorporate local sensing means for producing a signal indicative of the movement of one of the races relative to the other. The sensing means is mounted in close proximity to one of the races and is usually directly secured to the race intended to be stationary. The sensing means can be mounted laterally of the bearing races or radially inside or outside of the bearing races.

The sensing means may employ an inductive or capacitive sensor and oscillatory means and a body or component, such as a disc, carried by the movable race creates an influence detected by the sensing means to provide the signal. In other constructions the sensing means detects changes in electromagnetic radiation or fluid pressure created by the component or body carried by the movable race.

22 Claims, 37 Drawing Figures

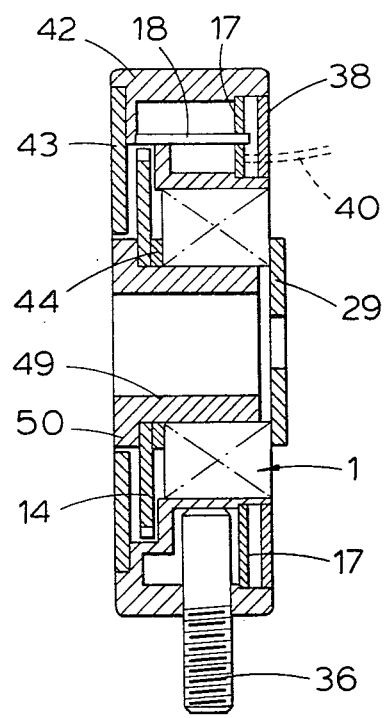
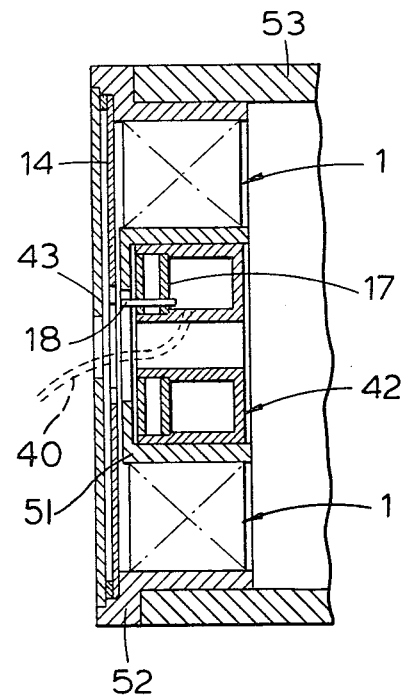
Fig. 13  Fig. 14
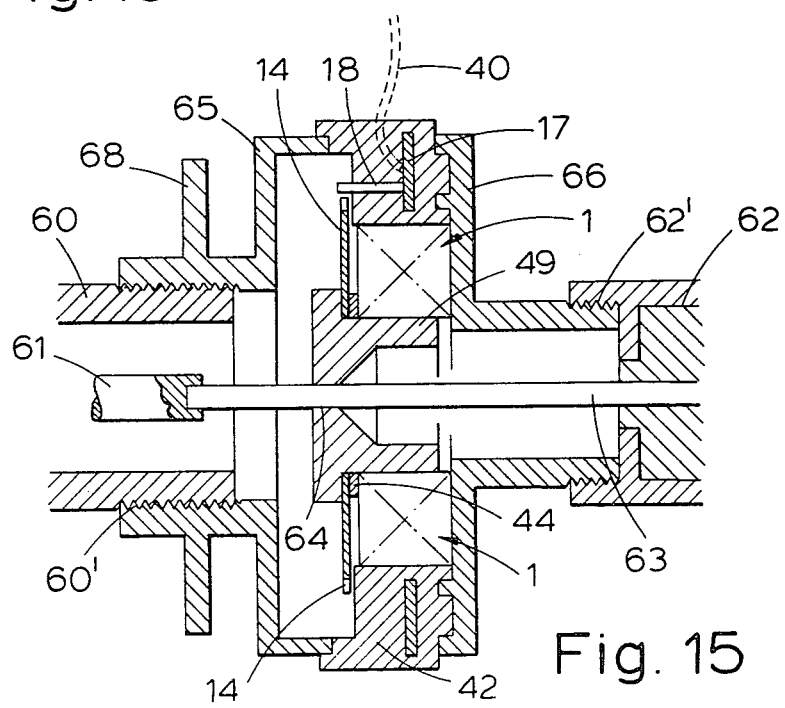
Fig. 15

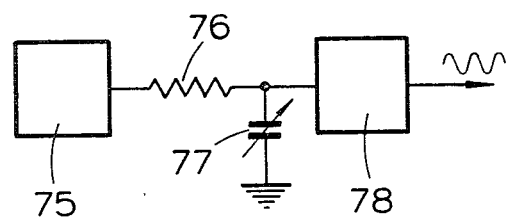
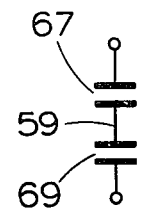
Fig.19     Fig.19A
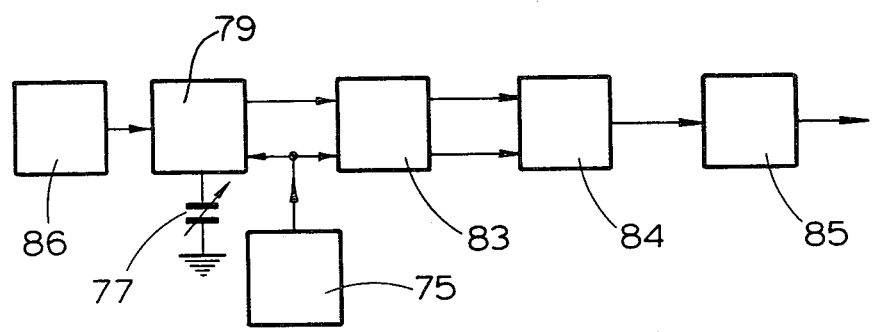
Fig.20
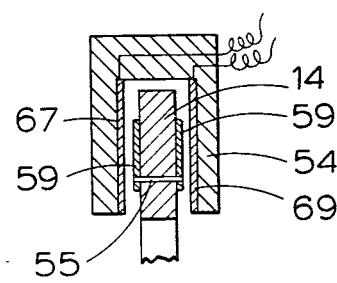
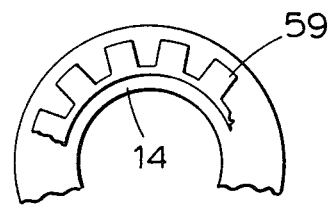
Fig.21     Fig.22

MECHANICAL ASSEMBLIES EMPLOYING SENSING MEANS FOR SENSING MOTION OR POSITION

BACKGROUND TO THE INVENTION

The present invention relates to mechanical assemblies, particularly bearing assemblies, incorporating sensing means for sensing positional relationships or motion.

Bearing or mechanical assemblies which employ electromagnetic tachogenerators are know per se. In one form of known assembly a stationary coil has a current induced therein by rotating magnets. To achieve a reasonable signal to noise ratio the coil requires a large number of turns and this is disadvantageous primarily since sufficient space to accommodate the coil needs to be provided. Hitherto it has also been generally difficult to provide a reliable speed-indicative signal which is accurate in the low to zero speed range. Where a tachogenerator is used to sense the speed of a shaft it is known to employ an additional drive means coupled to the end of the shaft to step up the rotary motion but this leads to an expensive and bulky construction. Otherwise a magnetic projection can be attached to the shaft and the tachogenerator is then carried on a special mounting such as an outrigger bracket. It is known to construct a bearing assembly incorporating a tachogenerator but strong magnetic fields in or near bearings are generally undesirable since metallic particles will tend to be attracted to the bearing. Known assemblies are often bulky and complex and there is a need for simpler constructions in which standard units, such as rotary bearings, can be adopted without extensive modification.

SUMMARY OF THE INVENTION

The present invention provides a mechanical assembly or bearing assembly which comprises relatively movable parts and sensing means with at least a sensor mounted to one of the parts or stationary for sensing the passage of at least one element moving with the other of the parts and for providing a signal indicative of the movement or position of the other of the parts.

In the case of a rotary bearing the races may form the aforementioned movable parts. In accordance with certain embodiments of the invention the sensing means can be mounted on or in carrier means such as a housing which is arranged at one side of the bearing races and is preferably detachably secured thereto. In other embodiments the carrier means or housing can be disposed radially inwards or outwards of the bearing races. Thus, according to the application or use, the available space can be utilized as appropriate.

The sensor and sensing means may take a variety of forms. The sensing means may employ electronic devices or circuits and the sensor may then be an inductive probe or a capacitive sensor. In the former case a disc with teeth, projections or regions of magnetic or electrically conductive nature can influence an electromagnetic field provided by the inductive probe. In the case of a capacitive sensor the plates of the sensor may be formed by relatively movable components connected with the bearing races.

In other embodiments of the invention the sensing means may employ light or other short wavelength radiation which is modified and sensed in accordance with the rotational speed or position.

The sensing means may also sense pressure changes, for example, in a fluid, or sonic energy, created by the passage of the element or elements in question.

The sensing means can provide either a digital or an analogue signal, or both, indicative of speed and/or position.

An assembly constructed in accordance with the invention may have several separate bearings and a single common sensing means or conversely a single bearing with several sensing means.

In accordance with the invention a mechanical assembly comprises first and second relatively movable parts, such as bearing races, means for movement with the first part to influence an electromagnetic field, sensing means for sensing the movement of the first part in relation to the second part, the sensing means employing an inductive sensor, oscillatory means for energizing the sensor to create said electromagnetic field which is subjected to said influence and means for producing a signal dependent on said influence and indicative of said movement of the first part.

Further in accordance with the invention a mechanical assembly comprises first and second relatively movable parts such as bearing races, sensing means for sensing the movement of the first part in relation to the second part, the sensing means employing a capacitive sensor with effective operative plate components movable relatively as the relative movement between the first and second parts to produce a corresponding variation in the capacity of the sensor, oscillatory means which is affected by the variation in the capacity of the sensor and means for detecting the affect thus-produced by the sensor to provide a signal indicative of the relative movement between the first and second parts.

In another aspect the invention provides a mechanical assembly comprising first and second relatively movable parts, such as bearing races, means for movement with the first part and providing discrete elements which serve to influence the flow of fluid in accordance with the relative movement between the parts, means for establishing said fluid flow and sensing means for sensing the fluid flow subjected to said influence to thereby provide a signal indicative of the relative movement between the parts.

In a further aspect the invention provides a bearing assembly comprising first and second relatively movable bearing races, means for movement with the first race to influence electromagnetic radiation, sensing means for sensing the movement of the first race in relation to the second race, the sensing means being disposed in close proximity to the bearing races with at least part of the sensing means disposed externally of said bearing races, the sensing means comprising electromagnetic-radiation-energy emitting means, means for receiving said radiation influenced by said influencing means, the means for emitting radiation and the means for receiving radiation each being non-movable relative to the second bearing race and means for producing a signal dependent on the received radiation and indicative of said relative movement between the bearing races.

The invention also provides a portable tachometer comprising first and second relatively rotatable bearing races with rolling elements therebetween, means for movement with the first race to influence an electromagnetic field, sensing means for sensing the rotation of the first race in relation to the second race, the sensing means at least including an inductive sensor, oscillatory means for energizing said sensor to produce said electromagnetic field which is subjected to said influence, means for producing and processing a signal dependent on said influence and indicative of the rotation of the first race and display means fed by said signal producing and processing means for displaying a read out representing the rotary speed of the first race.

The invention may be understood more readily, and various other features of the invention may become apparent, from consideration of the following description.

BRIEF DESCRIPTION OF DRAWINGS

Embodiments of the invention will now be described, by way of examples only, with reference to the accompanying drawings, wherein:

FIGS. 12 to 15 are sectional side views of further bearing assemblies constructed in accordance with the invention;

FIG. 19 is a schematic block diagram of a further sensing means with a capacitive sensor which may be employed in or with the assemblies constructed in accordance with the invention;

FIG. 19A depicts a configuration for the capacitive sensor provided in sensing means for use with assemblies constructed in accordance with the invention;

FIG. 20 is a schematic block diagram of a modified form of the sensing means shown in FIG. 19 which may be employed in or with the assemblies constructed in accordance with the invention;

FIG. 21 is a diagrammatic side view of part of one form of capacitive sensor for use with assemblies constructed in accordance with the invention;

FIG. 22 is a diagrammatic end view of the part of the sensor shown in FIG. 21;

DESCRIPTION OF PREFERRED EMBODIMENT

Before describing the various assemblies and devices which embody the present invention it is worth emphasizing at this stage in all cases where bearings are used in the assemblies these bearings can be entirely conventional and are unmodified per se or only modified in minor respects.

Figure 1:
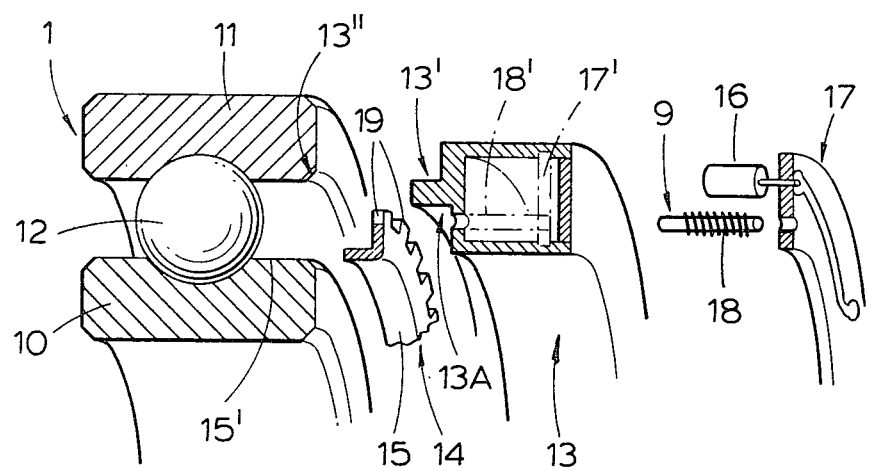
FIG. 1 is an exploded perspective view of part of a first assembly employing a rolling element bearing and sensing means constructed in accordance with the invention.

As shown in FIG. 1, a conventional rolling-element bearing 1 has an inner race 10, an outer race 11 and rolling elements, in this case balls 12, therebetween. For convenience, the conventional cage for retaining and spacing the balls 12 is omitted from the drawing and it is assumed for the purposes of illustration that the inner race 10 is rotatable while the outer race 11 is stationary.

Figure 3:
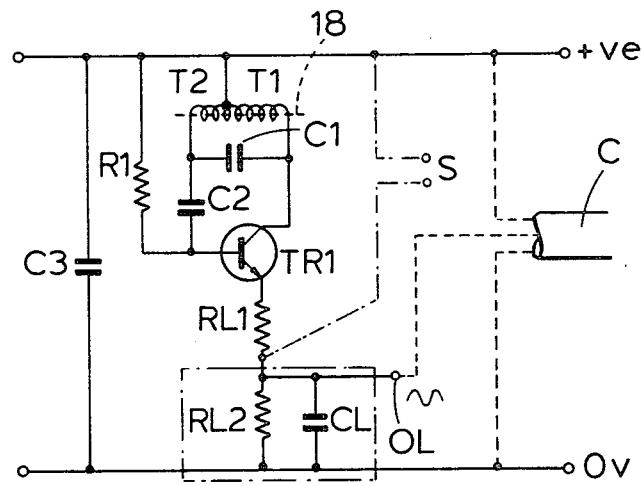
FIG. 3 is a circuit diagram depicting one form of sensing means for use in assemblies constructed in accordance with the invention.

In accordance with the invention electronic sensing means is provided for sensing relative movement between the races 10, 11 thereby to provide a signal directly indicative of rotary speed. The sensing means in this embodiment employs a circuit as depicted in FIG. 3 and is carried and housed by a component in the form of a carrier ring 13 mounted to the outer race 11 and in this illustrated assembly the ring 13 has a recessed shoulder 13' at its inner side which frictionally engages with corresponding flanks 13" of the outer race 11 as a press fit. As an alternative the ring 13 can be adhesively bonded, or keyed, or clamped, e.g., with screws, to the race 11. A further recess 13A beneath the shoulder 13' of the ring 13 accommodates a further component in the form of a toothed disc 14 which is designed to co-operate with the sensing means but which does not contact the ring 13. The toothed disc 14 has a flange 15 which is frictionally engaged as a press-on fit with the outer face 15' of the inner race 10. The electrical components of the sensing means, described hereinafter, are collectively designated 16 in FIG. 1 and are supported by a printed circuit board 17 conveniently of annular or part annular shape. The printed circuit board 17 is itself mounted in the ring 13, which acts as a housing therefor, in the position denoted by dotted lines 17'. The ring 13 can be a moulded plastics component, preferably made from an epoxy resin. The sensing means includes an inductive sensor or probe 9 in the form of an inductive coil wound onto a ferrite core or rod 18 also mounted to the printed circuit board 17. The ferrite rod 18 adopts the position denoted by dotted lines 18' in the ring 13 and projects parallel to the axis of rotation of the bearing 10, 11 to terminate closely adjacent the teeth 19 of the disc 14. In general, the movement of the teeth 19 in spaced succession as the disc 14 rotates with the race 10 cause discontinuity sensed by the sensor or probe 9. In this case the disc 14 is an integral metal component with at least the teeth 19 being made from an electrically conductive material in which eddy currents can be produced locally of the rod 18 by an alternating current set up in the inductive coil by an oscillator of the sensing means. The discontinuity produced by the teeth 19 and the gaps therebetween successively moving past the rod 18 give rise to changes in a parameter of the circuit of the sensing means which changes are detected to provide a signal directly indicative of rotary speed.

The operation of the sensing means will be described in more detail in conjunction with FIG. 3.

As shown in FIG. 3 the circuit of the sensing means comprises an R.F. tuned oscillator with a single NPN transistor TR1 having its emitter connected via resistors RL, RL2, to a negative d.c. voltage. A capacitor CL is connected in parallel with the resistor RL2. An output signal is generated across the capacitor CL and is taken off via an output OL. A tuned sub-circuit is composed of a centre-tapped coil T1, T2 wound onto the ferrite core or rod 18 and capacitors C1, C2 connected in series between the collector and base of the transisor TR1. The coil T1, T2 is connected in parallel with the capacitor C1 and has its centre tap connected to a positive d.c. voltage. A bias resistor R1 is connected between the base of the transistor TR1 and the positive d.c. voltage. The circuit is energized by the positive and negative voltage supplies which may be conveniently combined in a small electric cable C with the output OL. In one practical embodiment of the circuit the following components are utilized.

| TR1 | BC182-National Semiconductors |
|---|---|
| RL1 | 47Ω ¼ w |
| RL2 | 820Ω ¼ w |
| R1 | 100KΩ ¼ w |
| T1 | 12 Turns ⎫ 38 s.w.g. enamelled copper wire |
| T2 | 50 Turns ⎭ |
| Ferrite | Rod diameter 1.6 mm Rod Length 11.5 mm (overall) with or without a modified end portion with a chisel-like shape or a tapered, e.g., frusto-conical shape |
| C1 | 2200 pF |
| C2 | 100 pF |
| C3 | 0.1μF |
| CL | 0.22μF |
| Voltage supply-Typically 12v. | |

Figure 4:
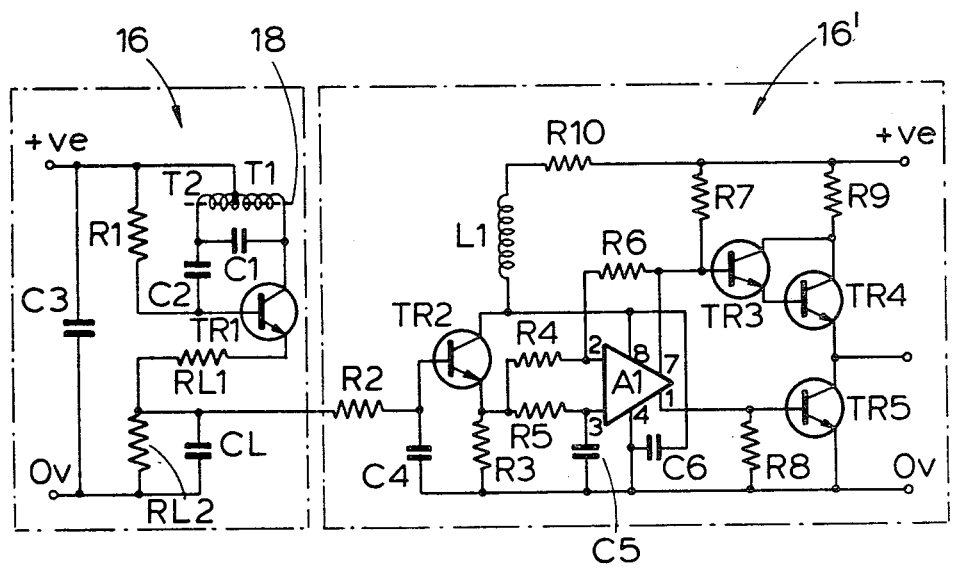
FIG. 4 is a circuit diagram depicting a modified form of sensing means for use in assemblies constructed in accordance with the invention.
Figure 5:
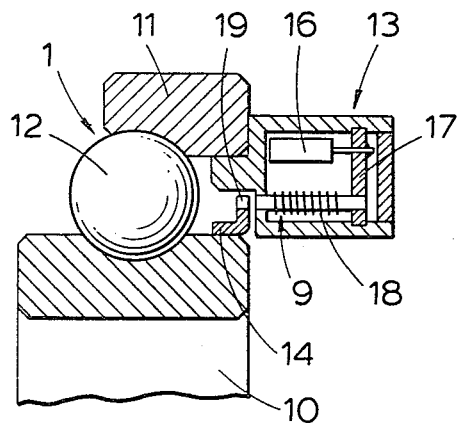
FIGS. 5 to 10 are diagrammatic representations of other bearing assemblies constructed in accordance with the invention.

During operation, the circuit oscillates continuously at radio frequency to generate an alternating current in the inductive coil T1, T2 and eddy currents are induced in each tooth 19 as the latter moves across the axis of the rod 18. The alternate presence and absence of such eddy currents, corresponding to the alternate presence and absence of a tooth in the vicinity of the rod 18, produces reflected impedance changes in the collector load which produces a variation in the emitter current. This in turn, gives rise to a typical waveform of the type shown in FIG. 3 as an output. For a particular spacing between the sensor 9 (18, T1, T2) and the teeth 19 of the disc 14 the waveform has a constant amplitude and if desired the pulsed or square output signal can be amplified and/or additionally processed and shaped to provide a series of pulses the frequency of which directly represents the rotational speed of the inner race 10. The circuit can be modified as depicted by chain-dotted lines with the components RL2, CL remote, from the sensing means and the output provided on a pair of leads S. The digital signal produced or derived from the sensing device can be utilized in a variety of ways, for example in a comparator fashion, to provide, in other related embodiments, a measure of angular acceleration or position for example. In one embodiment, a direct count and visual display of the number of pulses occurring in a specific time period can be produced. In a modified sensing device, described in outline hereinafter in connection with FIG. 18, the affect of the teeth 19 on the operation of the oscillator may be detected as a change in phase rather than a change in impedance but nonetheless a digital signal can still be produced which represents rotary speed. FIG. 4 depicts a modified circuit where like reference numerals denote like parts to FIG. 3. The circuit of FIG. 4 has an additional line driver stage 16' fed by the basic oscillator 16. In a practical embodiment of the line driver circuit the following additional components were utilized:

| L1 | 22 H SC30/22 |
|---|---|
| R2 | 1K ¼w |
| R3 | 1.2KΩ ¼w |
| R4 | 10KΩ ¼w |
| R5 | 10KΩ ¼w |
| R6 | 820KΩ ¼w |
| R7 | 820Ω ¼w |
| R8 | 1KΩ ¼w |
| R9 | 18Ω ¼w |
| R10 | 10Ω ¼w |
| C4 | 0.047 μF |
| C5 | 6.8 μF |
| C6 | 0.22 μF |
| A1 | LM111H National Semiconductor |
| TR2 - | BC182-National Semi conductors |
| TR3 - | 2N2222A-National Semi conductors |
| TR4 - | 2N2222A-National Semi conductors |
| TR5 - | 2N2222A-National Semi conductors |

Figure 2:
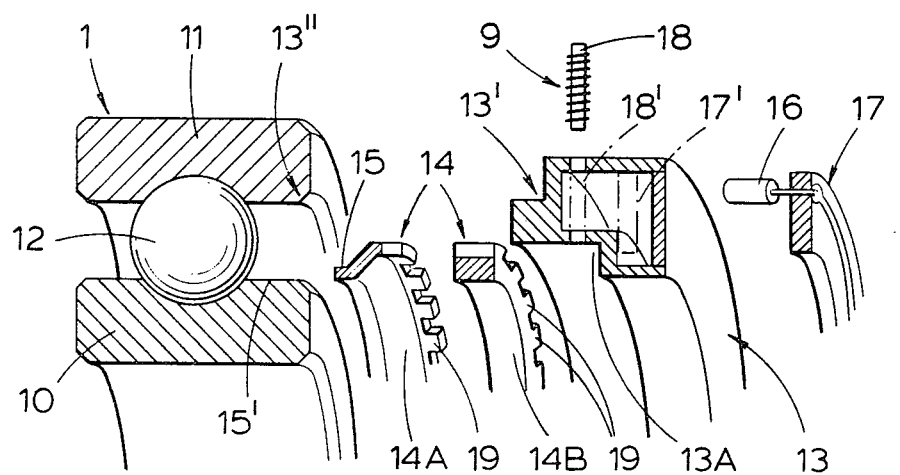
FIG. 2 is an exploded perspective view of part of a second assembly constructed in accordance with the invention.

In the assembly shown in FIG. 2 like reference numerals are used to denote the same features as the assembly described and illustrated in FIGS. 1 and 3. In contrast to FIG. 1 however the assembly of FIG. 2 has the orientation of the rod 18 radial to the axis of rotation instead of parallel thereto. The disc 14 can be a shaped pressed-on metal, e.g., steel, structure 14A or a more simple plane ring component 14B produced by powder metal technology with projections or teeth 19 around its periphery. The particular orientation of the sensor 9 in relation to the teeth 19 is not particularly critical and angular dispositions can be adopted. Also the provision of the disc 14 is not essential and in some bearing assemblies where high accuracy is not needed the objective of providing a speed or position indicative signal can be achieved by simply sensing the movement of the rolling elements (12) themselves.

In one specific notable application of the invention the disc 14 and the ring 13 with the sensing means can be mounted to a wholly standard vehicle wheel bearing thereby providing a signal for a digital tachometer. If, for example, a digital display of revs/minute is required the disc 14 can have 60 teeth and a digital counter can count the number of output pulses produced by the sensing means over a one-second period.

In this case the inner race 10 would be stationary on the wheel hub while the outer wheel race 11 would rotate and the positions of the ring 13 and the disc 14 would preferably be reversed. With a front wheel drive vehicle, however, where the inner race 10 rotates and the outer race 11 is stationary the arrangement as illustrated can be adopted without alteration.

Figure 6:
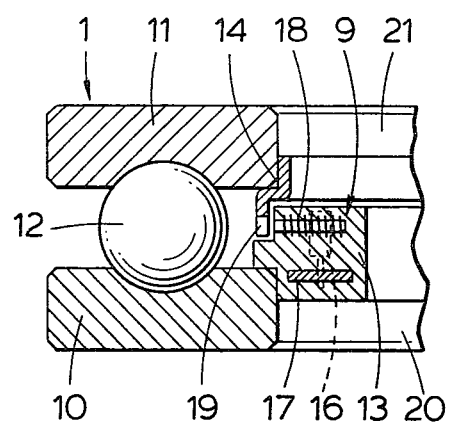
Figure 7:
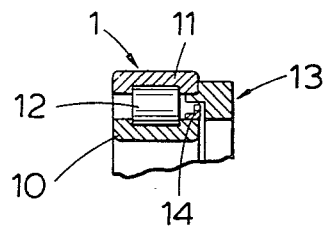
Figure 9:
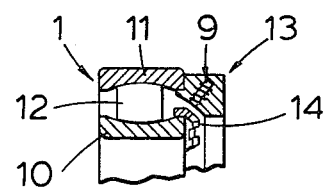
Figure 8:
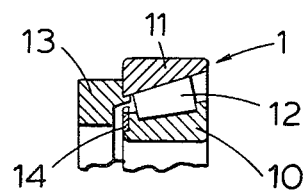
Figure 10:
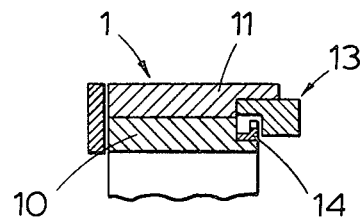

The sensing means as described may also be incorporated or used with a variety of other forms of bearings. FIGS. 5 to 10 depict examples of other forms of bearings where again like reference numerals denote the same or analogous components to FIGS. 1 to 4. Thus FIG. 5 has a rotating inner race 10 and balls 12 as rolling elements but the outer race 11 is here in angular contact with the balls 12. FIG. 6 represents a thrust bearing with load plates 20, 21. FIG. 7 represents a roller bearing, FIG. 8 a tapered roller bearing, FIG. 9 a spherical bearing and FIG. 10 a plain bearing. In all cases provision of the separate disc 14 and the ring 13 and the sensing device does not affect the design and operation of the bearings which can be quite standard.

The sensing means need not detect rotary movement only and linear movement can be detected by utilizing a moving rack or the like in place of the disc 14. Indeed the invention can be applied to any moving system where it is desired to detect movement or position.

In some applications the movement which is to be detected is especially rapid and a disc or rack with a large number of teeth, such as is illustrated, would cause the circuit to reach the limits of its response time in relation to the transitions producing the square wave. In these cases it is easy to use a component with just one tooth or a few teeth. For example, with a high speed rotary bearing a single tooth on the periphery of the disc 14 would produce one pulse per revolution. The use of toothed components and metal components is also not essential to the operation of the sensing means as described. It is only necessary to produce some discontinuity in the path of relative movement of a conductive or magnetic influence sufficient to affect the operation of the oscillator of the sensing means to provide the necessary detecting function. In one simple alternative arrangement, especially applicable to rotary bearings, a plastics ring may carry a series of discrete discs, or slugs, or other bodies, of metal, such as brass or aluminium, seated into holes or bonded to the ring and these metal bodies would act in an analogous fashion to the individual teeth described hereinbefore. In the case of high speed bearings again a single metal body on the plastics device may suffice. Instead of metal bodies one or more discrete magnets can be carried by the plastics ring and here there would be flux linkage between the individual magnet or magnets and the inductive coil T1, T2 of the sensing device. Otherwise the operation and construction of the sensing device and the assemblies utilizing the same can be as described above.

Although the use of the printed circuit board and the carrier ring 13 for the sensing device is quite practicable and has certain advantages with small scale production other methods of construction for the sensing device can be adopted. Thus in one method the individual electrical components of the sensing device are wired in a jig mould and the mould filled with plastics, such as epoxy resin, preferably by injection moulding to encapsulate the electrical components and form a permanent housing (c.f. the ring 13) therefor. In another method of construction a flexible printed circuit carrying the electrical components is disposed around a desired bearing circumference and then a plastics material is again used to encapsulate all the components. One advantage of this technique would be that a standardized printed circuit board can be used to provide a variety of sizes of housings to match a range of bearings.

The circuit of FIG. 3 or 4 is eminently susceptible to an integrated circuit conveniently encapsulated or merely embedded in a structure such as the carrier ring 13. The circuit can also be constructed by thick or thin film techniques where the circuit components are deposited on substrates such as glass or ceramic forming part or all of structure such as the carrier ring 13. Again a standard circuit can be used for a variety of different sized carrier or housing components. Even with standard electrical components the device can be compact and additional electronic circuits and devices can easily be incorporated into the bearing assembly.

Figure 11:
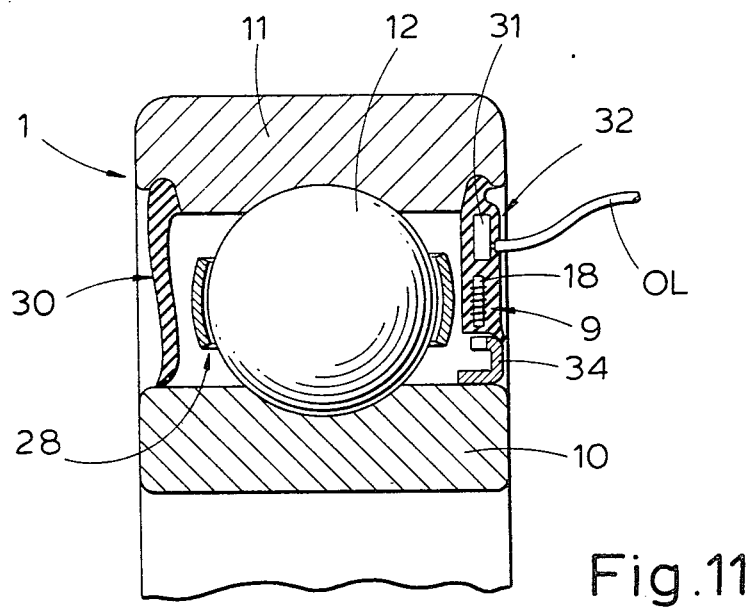
FIG. 11 is a diagrammatic side view of another rolling element bearing assembly constructed in accordance with the invention.

FIG. 11 depicts another rotary bearing employing a sensing device here mounted in another fashion. The bearing as depicted has a conventional cage 28 locating the balls 12 between the inner race 10 and the outer race 11. A conventional flexible seal 30 is located at one side of the bearing between the races 10, 11 and is fitted to the outer race 11. A flexible cover 32 complementary to the seal 30 and incorporating an integrated circuit chip 31, for example, or some other means embodying the sensing means or circuit of FIG. 3 or 4 except for the coil, is located at the other side of the bearing. The cover 32 can also be fixed to the outer race if desired but in any event remains stationary and also performs a sealing function. A toothed ring or analogous component 34 is again mounted to the inner race 10. The ferrite core or rod 18 carrying the electrical coil extends radially to intersect the path of movement of the discontinuity of the component 34 and the rod 18 is mounted to the cover 32.

Figure 12:
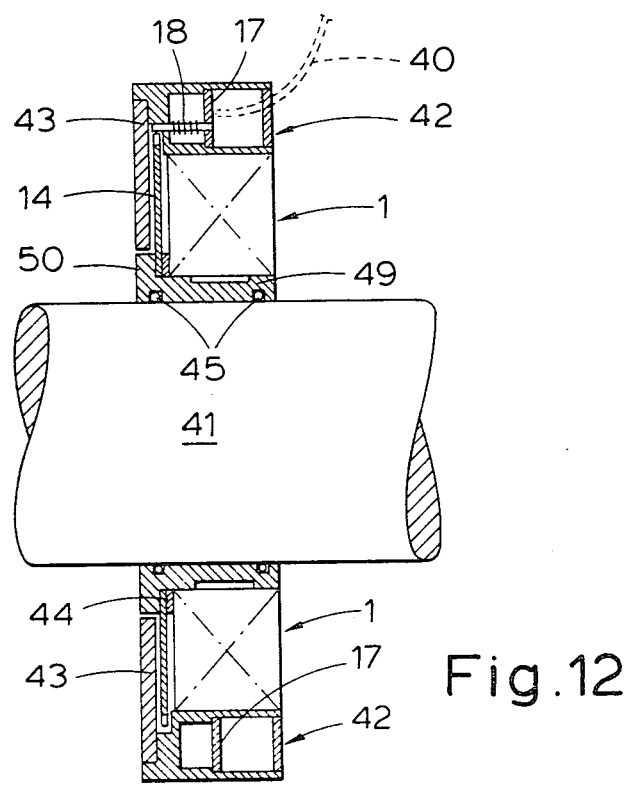

In the embodiment illustrated in FIG. 12 a bearing assembly has a sleeve 49 with a pair of O-rings 45 on its inner surface. The sleeve 49 has a flange 50 at one end which locates a toothed disc 14. A sensor unit or housing 42 is arranged concentrically with the sleeve 49. A standard rolling element bearing 1 represented schematically and having inner and outer rings or races (e.g., as in FIG. 1) is disposed between the sleeve 49 and the housing 42 to render these components relatively rotatable. A spacer 44 locates between the bearing 1 and the disc 14. The housing 42 contains sensing means which may be constructed as described and illustrated in FIG. 3 or 4. The components of the sensing means are again mounted on a printed circuit board 17 and the ferrite rod or probe 18 projects across the external periphery of the toothed disc 14. A dust shield 43 is snap-fitted between the flange 50 of the sleeve 49 and a recessed shoulder in the housing 42. The assembly as described can be mounted onto a shaft or spindle 41 which projects into or through the sleeve 9. The housing 42 can be held stationary by any suitable means and rotation of the spindle 41 moves the teeth of the disc 14 passed the probe 18. The sensing means then operates to produce a rotary speed-indicative signal as described.

In the embodiment depicted in FIG. 13, like reference numerals are used to denote like parts to FIG. 12. In the FIG. 13 embodiment, an adaptor 29 is used to rotatably connect the sleeve 49 to a rotary part (not shown) of generally smaller diameter than the shaft of spindle 41 of FIG. 1 and the O-rings 45 are omitted. A rod 36 is used in the FIG. 2 assembly to engage with a bracket or the like (not shown) thereby to lock the housing 42 in a stationary position. A detachable cover 38 is provided to provide access to the housing 42.

In the embodiment depicted in FIG. 14 again like reference numerals are used to denote like parts to FIGS. 12 and 13. In contrast to the assemblies of FIGS. 12 and 13 however, the stationary housing 42 of FIG. 14 is provided at the inside of the assembly and is held by a sleeve 51. The toothed disc 14 here has the teeth on its inner periphery for movement passed the probe 18 of the sensing means. The toothed disc 14 is mounted to a flanged cylindrical member 52 which rotates relative to the housing 42 and the sleeve 51 which are preferably held stationary. As illustrated, a cylindrical part 53, which may be the hollow end portion of a shaft or the like, is engaged with the member 52 so that the sensing means provides a signal indicative of the rotation of the part 53.

FIG. 15 depicts a modified assembly similar to FIGS. 11 and 12 and particularly designed for use with speedometer cables of motor vehicles. In FIG. 15, like reference numerals again denote like parts to the previously-described embodiments. A structural member 60 normally part of a gearbox, contains a rotatable coupling 61. The member 60 has an external threaded region 60' which normally receives an internally-screw threaded region 62' of a conventional speedometer cable end cap 62. The inner square-sectioned rotatable core 63 of the speedometer cable would normally locate directly with the coupling 61. In the illustrated assembly, however, the core 63 is extended to project through the basic bearing 1 and engages in a square piercing 64 in the sleeve 49. The housing 42, containing the sensing means, engages with two cylindrical bodies 65, 66. The body 65 is threaded internally to mate with the threaded region 60' of the member 60 while the body 66 is threaded externally to receive the threaded region 62' of the cap 62. Thus the bodies 65, 66 hold the housing 42 stationary. The rotary movement of the coupling 61 drives the core 63 to operate the speedometer in the usual manner. In addition, the core 63 rotates the sleeve 49 and the toothed disc 14 and the sensing means produces a signal indicative of this rotary speed.

It is desirable to provide the body 65 with a cooling fin 68 and to manufacture this body 65 and preferably also the body 66 from a material such as an aluminium or duralumin to act as a heat shield for the housing 42 and the electronic components therein.

In the assemblies as described and illustrated in FIGS. 12 to 15 the electrical cables or leads denoted by dotted lines 40 and connecting to the sensing means can be taken out at any convenient region and not necessarily in the position as illustrated.

Figure 16:
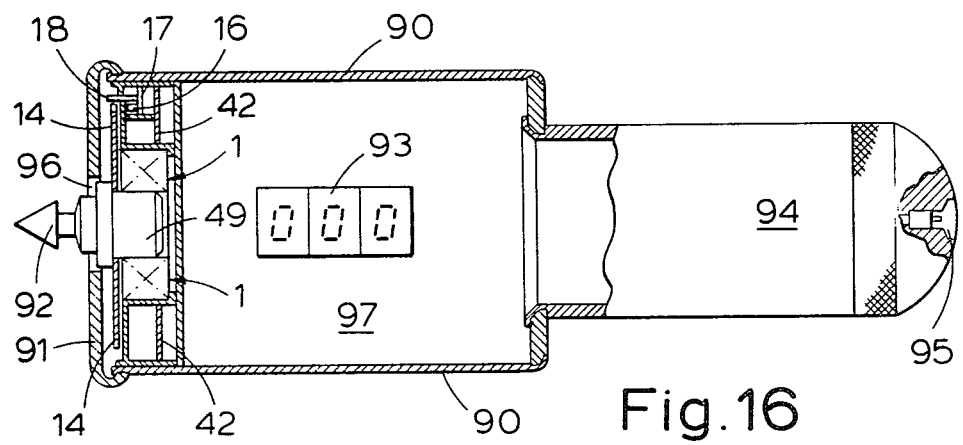
FIG. 16 is a diagrammatic side view of a portable tachometer instrument constructed in accordance with the invention.

FIG. 16 depicts a portable tachometer instrument which employs an assembly of the type shown in FIGS. 12 and 13. This assembly is mounted at one end of a housing 90, conveniently made of synthetic plastics. A cap 91 at this end of the housing 90 has a central bore 96 and a connector 92 here in the form of a conical member projects through the bore 96. The connector 92 is conveniently detachably fitted, e.g., by a push-fit into the sleeve 49 which is rotatably secured to the inner race of the bearing 1. The connector 92, which can be replaced to suit a particular application, can be mated to any rotatable mechanism or device and then the rotation of the toothed wheel or disc 14 produces the speed indicative signal as before. The speed-indicative signal is processed by means in the interior 97 of the housing 90 and displayed as a digital read-out 93 visible from the side of the housing 90. The power for the sensing means 16 can be provided by re-chargeable batteries (not shown) mounted in a space 94 of the housing 90. A socket 95 at the opposite end of the housing 90 serves to connect the batteries to a charging unit or supply.

As mentioned previously additional electronic circuits and devices can be provided to process the waveform produced by the basic circuit of FIG. 3.

Figure 17:
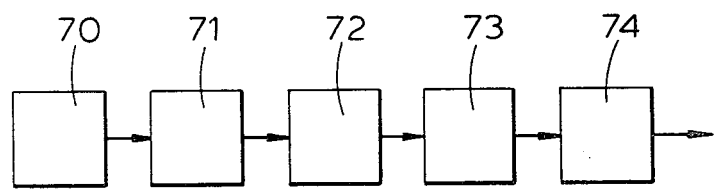
FIG. 17 is a schematic block diagram of a digital to analogue converter which can be used with the sensing means of assemblies constructed in accordance with the invention.

FIG. 17 depicts an example of an additional processing circuit in the form of a digital to analogue converter for the sensing means of FIG. 3 or 4. In FIG. 17, the oscillator and detector circuit of FIG. 3 or 4 is designated 70 and the output therefrom is optionally fed through an amplifier and shaper 71 to drive a monostable circuit 72. The sharp square wave digital output produced by the circuit 72 has a frequency representing motion and the output of the circuit 72 is fed to an integrator 73 which provides an analogue voltage the amplitude of which is proportional to motion. The analogue output from the integrator 73 is finally amplified by an amplifier 74.

Figure 18:
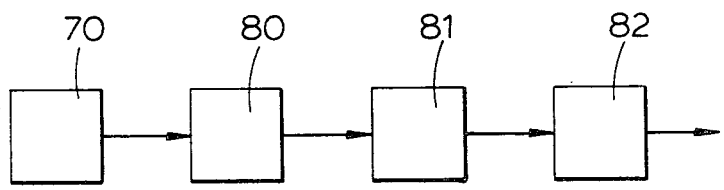
FIG. 18 is a schematic block diagram of a modified form of the sensing means shown in FIG. 3 which may be employed in or with the assemblies constructed in accordance with the invention.

FIG. 18 represents an alternative form of detecting operation for producing a waveform from the sensing means related to the rotary motion or position in which the change in phase in the alternating current in the oscillator is sensed. In FIG. 18 the oscillator of FIG. 3 or 4 denoted 70 feeds a phase shift detector 80 which produces a pulsed waveform related to speed and this waveform is amplified by amplifier 81 and shaped by shaper 82 to provide a more regular square waveform.

In other embodiments of the invention the inductive sensor 9 is replaced by a capacitive sensor or probe. Otherwise however the assemblies described hereinbefore can be adopted without extensive modification. The basic circuit of FIG. 3 can be re-arranged so that C1 becomes the capacitive sensor and the coil T1, T2 now assumes a non-sensing function. One plate of the capacitive element C1, now constituting the capacitive sensor, could then be connected to the tuned circuit while the other plate would be formed periodically, for example, by the teeth 19 of a disc 14 or by the rolling elements 12 or by some other means. The operational change in the circuit of FIG. 3 caused by the change in capacitance of the sensor can be detected, for example as a frequency or phase change in the manner described to produce the speed or position indicative signal. Instead of being incorporated as a frequency-determining element of the oscillator, the capacitive sensor can be used to modify the output from a free-running fixed frequency oscillator and FIG. 19 is a block diagram depicting one example of this arrangement. In FIG. 19 an oscillator 75, produces a signal of say 10 MHZ and, feeds a network composed of a resistor 76 and a capacitive sensor 77 which varies in capacitance in accordance with speed or position. The capacitive sensor 77 feeds a detector and amplifier 78 which produces an output signal of the type shown. FIG. 20 depicts another arrangement wherein an oscillator 75 feeds a monostable device 79 and a logic device 83. The device 79 employs the capacitive sensor 77 to vary the width of its output pulses. The device 83 feeds a flip-flop device 84, the output of which is buffered by a buffer device 85. The monostable device 79 is triggered by a clock 86. The output from the device 79 is more than 1 clock period with the sensor 77 at its maximum value and less than 1 clock period with the sensor 77 at its alternate minimum value. The logic device 83 is designed to trigger the flip flop device 84 successively according to the length of the output pulse from the device 79. The device 84 thus produces a series of pulses with a repetition rate dependent on speed or position. The capacitive sensor 77 can be incorporated in a bearing assembly as described and exemplified hereinbefore. This necessitates constructing the sensor 77 with at least one moving component and at least one stationary component. To avoid problems in making electrical connection to the movable component the configuration depicted in FIG. 19A can be adopted which is equivalent to two capacitors in series. The centre plates of the series capacitors designated 59 can then be the movable component to which no electrical connection is made. The outer plates of the series capacitors designated 67, 69 can then be static components.

Figure 23:
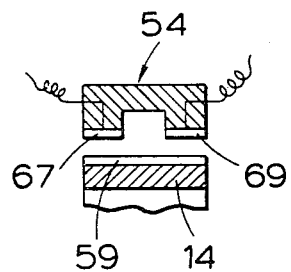
FIG. 23 is a diagrammatic side view of part of another form of capacitive sensor for use with assemblies constructed in accordance with the invention.
Figure 24:
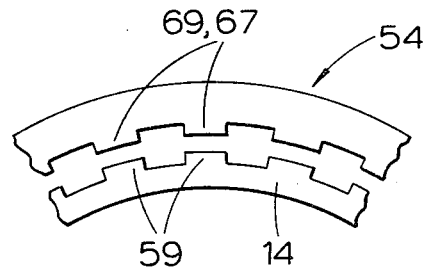
FIG. 24 is a diagrammatic end view of the part of the sensor shown in FIG. 23.
Figure 25:
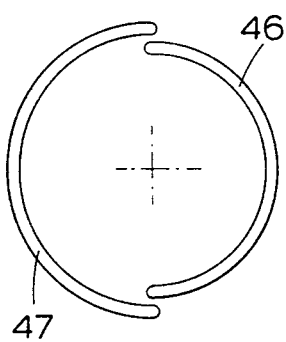
FIG. 25 is a schematic diagram depicting another form of capacitive sensor.

In general, the capacitive sensor 77 can be formed by axial concentric tubes or radial flat discs. The former configuration has the advantage that the capacitance variations can be maintained within close limits by relying upon the usual excellent tolerances of the bearing 1. FIGS. 21 and 22 represent schematically an arrangement where a disc 14, analogous to the toothed disc 14, of the other embodiments and made for example from plastics material has a series of interconnected plates 59 on its opposite side faces. The disc 14 rotates with one of the races 10, 11 of the associated bearing and can be mounted as described above. The plates 59 on either side of the disc 14 are also interconnected by means extending through the disc 14. Conveniently, the disc 14 can be a double-sided printed circuit board. A ring or housing 54 receives the disc 14 between complementary plates 67, 69 and the ring or housing 54 may be mounted in the manner of the analogous structure 13, 42 described hereinbefore. The electronic circuit associated with the capacitive sensor thus-formed can be built into the housing 54. Alternatively, two separate stationary discs forming or carrying the plates 67, 69 can encompass the disc 14 and the electronic circuitry can be separate and remote. The arrangement shown in FIGS. 23 and 24 has projections forming plates 67, 69 provided at the inner face of the housing 54 and the disc 14 has associated projections forming plates 59 formed at its outer peripheral surface. Conveniently the plates 67, 69, 59, are integral with their carrier bodies 14, 54 although separate plates can be fixed to the carrier bodies 14, 54. In any event the electronic circuitry can be separate and remote. Another type of capacitive sensor is depicted in FIG. 25. This sensor consists of a pair of concentric components in the form of half-cylinders or rings 46, 47 designed to rotate about one another. One component 46, 47 is fixed while the other embodiment 47, 46 rotates with the movable race of the bearing. An analogous construction (not illustrated) utilizes a pair of spaced shaped vanes, which may be semi-circular, as the components 46, 47. The capacitance formed by utilizing the components 46, 47 as the plates of the capacitive sensor varies according to the relative rotational position prevailing and changes progressively between maximum and minimum values. An analogue signal can thus be generated by an oscillator which varies according to the angular position or rotation as desired. Where a digital rotational speed indicative signal is desired the analogue signal can be converted into an equivalent digital signal but where angular resolution is of interest the analogue signal can be used directly.

Instead of employing sensing means with inductive or capacitive sensors as described, the various assemblies as illustrated and described can employ other forms of sensing means and sensors as will now be described.

Figure 26:
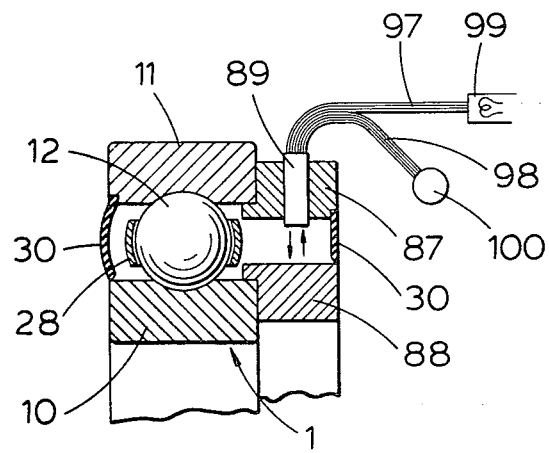
FIG. 26 is a diagrammatic side view of another bearing assembly made in accordance with the invention.

As shown in FIG. 26, two bodies 87, 88 are respectively mounted or located to the outer and inner races 11,10 of a ball or roller element bearing 1. The bodies 87, 88 can adopt a variety of shapes and/or different positions and FIG. 26 is merely illustrative. The main criterion is for the bodies 87, 88 to move relatively in proportion, direct or otherwise, to the motion to be sensed. It is assumed in this arrangement that the body 87 and the outer race 11 are stationary while the inner race 10 and the body 88 rotate. Where the race functions are reversed it is preferable to reverse the bodies 87, 88 so that the body 88 moves relative to the body 87. Preferably seals 30 protect the bearing and the sensing means. In this type or class of embodiment the body 87 carries or is provided with means emitting and receiving electromagnetic radiation, more usually visible light, although infra-red, ultra-violet or microwave wavelengths can be utilized. The body 88 carries or is provided with means for modifying the emitted radiation in accordance with its speed or position.

In the particular embodiment represented by FIG. 26, the body 87 supports a collection of optical fibres mounted in a ferrule 89 to face with their free ends the body 88. The fibres are sub-divided into a group 97 leading to a source 99 of radiation or light and a group 98 leading to a radiation detecting means 100. In this mode of operation, the body 88 has a series of spaced reflecting surfaces designed to reflect the radiation emitted from the fibre group 97 back to the fibre group 98 for detection. As the reflecting surfaces move passed the body 87 the emitted radiation is alternately reflected and not-reflected, e.g., absorbed or diffused, so that the detecting means 100 produces a pulsed or digital signal with a repetition frequency proportional to speed or position. This source 99 may be an L.E.D.,a tungsten lamp or a laser, for example, while the receiving or detecting means 100 can at least include a photocell, a photo transistor or a photo diode for example.

Figure 27:
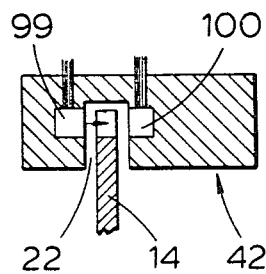
FIG. 27 is a diagrammatic side view of an alternative arrangement with sensing means for use in a bearing assembly.
Figure 28:
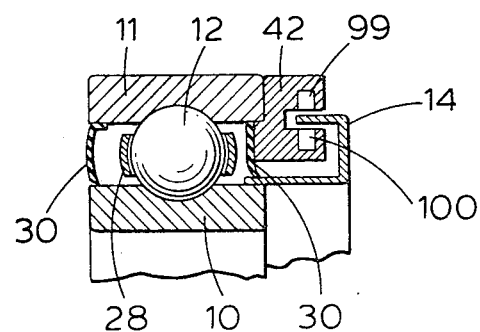
FIGS. 28 and 29 are diagrammatic side view of further bearing assemblies made in accordance with the invention.
Figure 29:
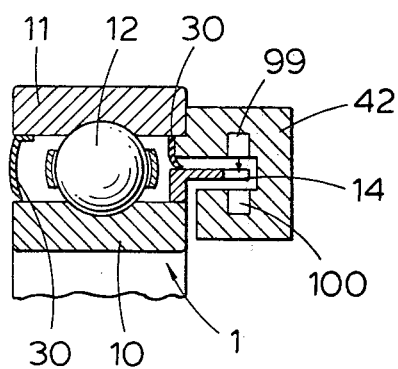
Figure 30:
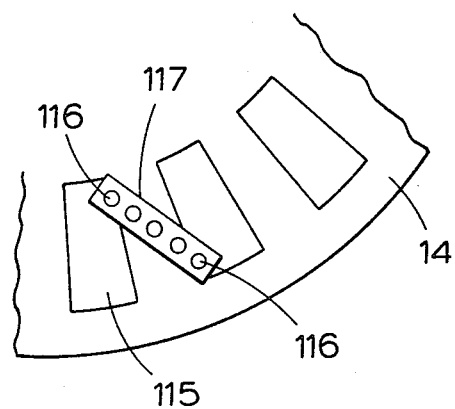
FIG. 30 is a view of part of another sensing means usable in a bearing assembly.
Figure 31:
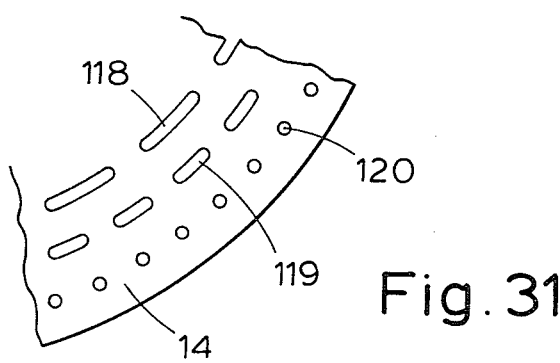
FIG. 31 is a view of a modified form of disc for use in the sensing means of a bearing assembly.

FIG. 27 depicts an arrangement which again employs a toothed disc 14 rotating with one of the bearing races. The teeth or projections 19 of the disc 14 here serve to alternately permit and obstruct the transmission of radiation across a gap 22 in a stationary housing 42 conveniently mounted in a similar manner to that depicted in FIG. 12 or 13, for example. The reference numerals 99 and 100 again denote the radiation source and the receiving or detecting means and these may be local devices supported in the housing 42 or remote devices connected to optical fibres as in the FIG. 26 arrangement. Instead of employing teeth, the disc 14 can have a series of holes, or windows to transmit the radiation. The disc 14 can also be wholly transparent or translucent and provided with a series of opaque regions. In a reflective mode, the disc 14 can have a series of mirror-like surfaces, e.g., chrome deposits on its side surface. The disc 14 may extend radially or parallel to the rotational axis or the disc 14 can form part of a shaped structure. FIGS. 28 and 29 depict assemblies employing the arrangement shown in FIG. 27. Where the sensing means is to sense angular position rather than motion, the sensitivity of the detecting means 100 can be increased by utilizing several radiation receivers, such as groups of optical fibres or direct receivers, such as photocells, which are inclined as an array to the orientation of the holes or windows or other transmitting or reflecting regions of the disc 14 or the body 88. FIG. 30 depicts an arrangement of this kind where the disc 14 has windows 115 therein and an array 117 of individual receivers 116 is positioned as shown. The total number of pulses produced for each revolution of the disc 14, and hence the associated bearing, can be increased considerably by logic curcuits-typically up 50,000 per revolution. It is also possible to produce a disc 14 with a number of separate series of transmitting or reflective regions. Thus FIG. 31 shows separate concentric groups of different-sized apertures denoted 118, 119 and 120. The groups 118, 119, 120 may be associated with their own receivers and simultaneously coarse and fine grade signals can then be provided for different purposes if desired. Another form of disc 14 is provided with a large number of radial grating lines which intersect a radiation beam to modify the radiation as desired. This type of disc 14 would provide a sinusoidal response. In another construction, separate discs with radial grating lines provide a Moiré fringe pattern which is analysed to provide a signal indicative of position or motion.

Figure 32:
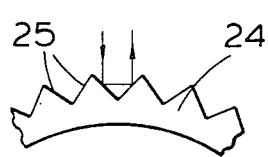
FIGS. 32 and 33 are partial view of ring components for use in the sensing means of a bearing assembly.
Figure 33:
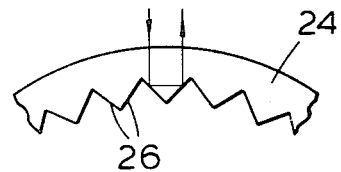

FIGS. 32 and 33 depict simple ring components 24 which can be used with or as the body 88 in the type of assembly shown in FIG. 26. In FIG. 32, the ring 24 has a number of regular prismatic reflecting surfaces 25 on its exterior periphery which reflect the incident radiation as shown when in the correct orientation vis-a-vis the radiation emitter. The surfaces 25 need not be external and FIG. 33 depicts a transparent ring 24 made, for example, from perspex, where the surfaces 26 on its inner periphery act as internal reflectors as shown. The surfaces 25, 26 of the rings 24 may extend radially to the axis of rotation or parallel to the axis of rotation. One of the bodies 87, 88 or both bodies 87,88 in the type of assembly shown in FIG. 26 may have additional reflectors or collimating or focussing means to direct and transform the radiation as may be desired. Another ring construction usable in the assemblies has a series of lines or bands scored or etched into its surface to concentrate and/or interrupt the passage of transmitted and/or reflected radiation.

Figure 34:
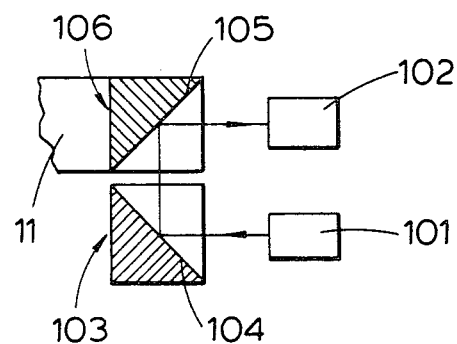
FIG. 34 is a diagrammatic side view of a modified form of sensing means for a bearing assembly.
Figure 35:
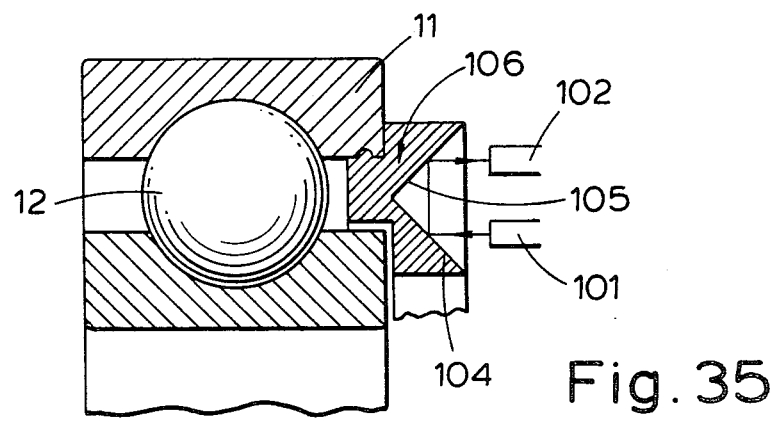
FIG. 35 is a diagrammatic side view of another bearing assembly made in accordance with the invention.

FIG. 34 depicts an arrangement where a radiation emitter 101 and a radiation receiver 102—which may be optical fibres connected to the source 99 and detecting means 100 as before—are entirely separate from the bearing assembly. A stationary body 103 having a reflective surface 104 directs radiation as shown to a series of reflective surfaces 105 of a body 106 which rotates for example with the outer race 11 of the associated bearing. The body 103 can be mounted to the stationary bearing race if desired. The reflective surfaces may be formed by making alternate light and dark bands within the body 106 and both bodies 103, 106 can be solid perspex rings. In this type of arrangement, the body 103 is not wholly essential and FIG. 35 depicts an analogous arrangement where the single body 106 rotating with the race 11 has both reflecting surfaces 104,105. It may be convenient to combine components of the sensing means with a seal for the bearing.

Figure 36:
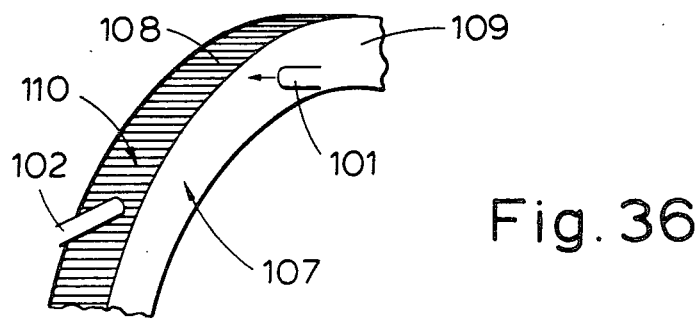
FIG. 36 is a perspective view of part of a further sensing means for a bearing assembly.

FIG. 36 depicts another arrangement which employs a transparent ring 107 illuminated internally with the radiation emitter 101. The ring 107 has a series of fine lines 108 etched or scored into its outer periphery 110. The emitter 101 is positioned closely adjacent the axial face 109 of the ring 107 and the ring 107 rotates with the moving race of the bearing (not shown). The receiver 102 is positioned adjacent the periphery 110 of the ring 107 and the passage of the lines 108 which appear as concentrations of radiation, usually diffuse, are converted to a digital signal as before.

Instead of being disposed at the lateral outside of the bearing races 10, 11 the sensing means depicted in FIGS. 26 to 36 and described above may be positioned at the radial inside or outside of the bearing races 10, 11 e.g. in the manner depicted in FIGS. 12-15.

Instead of relying upon electromagnetic energy, either directly or indirectly in accordance with the arrangements and assemblies described and illustrated, the sensing means for sensing motion or position may sense fluid pressure—such as sonic or ultrasonic energy or hydraulic or pneumatic pressure signals. In one example of this type of arrangement, the emitter or source 99 shown in FIGS. 26 to 29 is a pneumatic or hydraulic pressure source while the receiver or sensor 100 receives alternate pulses of pressure as pressure signals as the disc 14 rotates. It is also possible to utilize an arrangement analogous to the reflecting modes described wherein a pressure sensor in a line leading between the pressure source and the bearing assembly senses the pressure variation caused by the alternate interruption to the fluid flow. Although the disc 14, which has apertures or teeth, permitting and interrupting fluid flow is desirable it is also possible to rely for example on the passage of the rolling elements or balls to create a variation in oil pressure which is sensed as a signal indicative of rotary speed. Such an arrangement may be especially useful with an aircraft engine where high quality precision bearings rotate at high speed and and associated with oil pressure control and monitoring systems.

We claim:

1. In a bearing assembly comprising first and second relatively movable bearing races, rolling elements located between the races, means mounted to the first race for rotary movement therewith and sensing means mounted to the second race for sensing the rotary movement of said means, the improvement comprising:

said means mounted to the first race comprises a toothed metal disc, and said sensing means is supported by carrier means connected directly to said second race, and wherein said sensing means comprises oscillatory circuit means including as a primary component an inductive element composed of a coil on a ferrite rod which is directly energized to produce an electromagnetic field which is influenced by the passage of the teeth of said toothed disc, and means for producing a signal dependent on said influence and indicative of said rotary movement of the first race.

2. In a bearing assembly comprising first and second relatively movable bearing races, rolling elements located between the races, means mounted for rotary movement with the first race to influence an electromagnetic field and sensing means for sensing the rotary movement of said influencing means, the improvement comprising:

said sensing means being disposed wholly within a boundary defined by a lateral projection of the radially outermost surface of the bearing races and being mounted to a side face of the second bearing race, and wherein said sensing means comprises ocillator means for energizing an inductive sensor to produce said electromagnetic field which is subjected to said influence and means for producing a signal dependent on said influence and indicative of said movement of the first race.

3. In a bearing assembly comprising first and second relatively movable bearing races, rolling elements located between the races, toothed means mounted for rotary movement with the first race to influence an electromagnetic field and sensing means for sensing the movement of said toothed means, the improvement comprising:

said sensing means comprising an inductive sensor composed of a ferrite rod carrying a coil, said ferrite rod extending closely adjacent the teeth of the toothed means and being disposed with its longitudinal axis parallel to the relative axis of rotation of said bearing races, oscillator means for energizing the inductive sensor to produce said electromagnetic field which is subjected to said influence, and means for producing a signal dependent on said influence and indicative of said movement of the first race.

4. A bearing assembly according to claim 1, wherein said carrier means is fixed to a side face of the second bearing race, and wherein the sensing means, carrier means, and the toothed disc are collectively disposed within a boundary defined by a lateral projection of the radially outermost surface of the bearing races.

5. A bearing assembly according to claim 1, wherein said sensing means, carrier means, and toothed disc are collectively disposed wholly within the axially and radially outermost surfaces of the bearing races.

6. A bearing assembly according to claim 4, wherein said carrier means is annular and is disposed symmetrically relative to the axis of relative rotation between the bearing races.

7. A bearing assembly according to claim 1, further comprising display means for displaying a read-out indicative of the rotary speed of the first race and coupling means for selectively coupling the first race to an object, the rotary speed of which is thereby displayed.

8. A bearing assembly according to claim 2, wherein said sensing means is supported by carrier means mounted to said side face of the second bearing race and wherein said sensing means, carrier means, and means mounted to the first race are all collectively disposed within a boundary defined by a lateral projection of the radially outermost surface of the bearing races.

9. A bearing assembly according to claim 2, wherein said sensing means is supported within carrier means located symmetrically relative to the axis of relative rotation between the bearing races.

10. A bearing assembly according to claim 1, wherein said ferrite rod is disposed in a position with its longitudinal axis parallel to the axis of relative rotation between the bearing races and extends beyond projections of the axial side faces of the teeth of the toothed disc.

11. A bearing assembly according to claim 2, wherein said influencing means is a toothed member and said inductive element consists of an elongate ferrite probe with a coil thereon disposed in a position with its longitudinal axis parallel to the axis of relative rotation between the bearing races, and wherein the ferrite probe is positioned closely adjacent the teeth of the toothed member and extends beyond projections of the axial side faces of the teeth of the toothed member.

12. A bearing assembly according to claim 1, wherein said ferrite rod is disposed in a position with its longitudinal axis normal to the axis of relative rotation between the bearing races, and wherein the axial extent of the teeth is larger than the diameter of the probe such that a projection of the outer surface of the probe is located within the axial extent of said teeth.

13. A bearing assembly according to claim 3, further comprising display means for displaying a read-out indicative of the rotary speed of the first race and coupling means for selectively coupling the first race to an object, the rotary speed of which is thereby displayed.

14. A bearing assembly according to claim 1, wherein said oscillator circuit means oscillates continuously at radio frequency and comprises a single transistor with a tuned load circuit, and said inductive element comprises a single center-tapped coil on said ferrite rod whereby said signal producing means develops a voltage which varies in proportion to the current flowing through said transistor.

15. In a bearing assembly comprising first and second relatively movable bearing races, means mounted for rotary movement with the first race and sensing means for sensing the rotary movement of said means, the improvement comprising:

said sensing means comprises oscillator circuit means which directly and continuously energizes an inductive element thereof to produce an electromagnetic field which is influenced by the passage of said means mounted for movement with the first race, and means for producing a signal dependent on said influence and indicative of said rotary movement of the first race, said sensing means being supported by cylindrical carrier means arranged symmetrically with respect to the axis of relative rotation between the bearing races.

16. In a bearing assembly comprising first and second relatively rotatable parts, means mounted for rotary movement with the first part and sensing means located to the second part for sensing the rotary movement of said means, the improvement comprising:

said means mounted to the first part comprises a toothed disc member, and said sensing means is carried by a stationary cylindrical housing symmetrical with respect to the axis of relative rotation movement between the first and second parts, and said sensing means comprises oscillator circuit means comprising an inductive element composed of a coil on a ferrite rod which is disposed to extend substantially parallel to the axis of relative rotary movement between the first and second parts, said inductive element being directly energized to produce an electromagnetic field which is influenced by the passage of the teeth of the disc member, and means for producing a signal dependent on said influence and indicative of said rotary movement of the first part.

17. An assembly according to claim 15, wherein said carrier means for the sensing means is annular.

18. An assembly according to claim 16, wherein the housing for the sensing means is annular.

19. A bearing assembly according to claim 1, wherein the carrier means is annular and is located to a peripheral surface of the second bearing race.

20. A bearing assembly according to claim 19, wherein the peripheral surface is radially external to the bearing races.

21. A bearing assembly according to claim 19, wherein the peripheral surface is radially internal of the bearing races.

22. A bearing assembly accordng to claim 1, wherein said carrier means is fixed to a side face of the second bearing race, and wherein the sensing means, carrier means and the toothed disc are collectively disposed within boundaries defined by lateral projections of the radially innermost and outermost surfaces of the bearing races.

* * * * *